(12) United States Patent
Chmeissani et al.

(10) Patent No.: US 7,184,518 B2
(45) Date of Patent: Feb. 27, 2007

(54) METHOD AND DEVICE FOR THE PRODUCTION OF DIGITAL IMAGES

(75) Inventors: Mokhtar Chmeissani, Barcelona (ES); Enrique Fernandez, Barcelona (ES)

(73) Assignee: Institut de Física D'Altes Energies, Bellaterra (ES)

( * ) Notice: Subject to any disclaimer, the term of this patent is extended or adjusted under 35 U.S.C. 154(b) by 0 days.

(21) Appl. No.: 10/493,270

(22) PCT Filed: Jul. 23, 2002

(86) PCT No.: PCT/IB02/03100

§ 371 (c)(1),
(2), (4) Date: Apr. 21, 2004

(87) PCT Pub. No.: WO03/019215

PCT Pub. Date: Mar. 6, 2003

(65) Prior Publication Data

US 2005/0018813 A1   Jan. 27, 2005

(30) Foreign Application Priority Data

Aug. 21, 2001   (ES) ................................ 200101933

(51) Int. Cl.
*H05G 1/64*   (2006.01)
(52) U.S. Cl. .................... 378/98.8; 378/19; 250/370.09
(58) Field of Classification Search ................ 378/19, 378/98.8, 62; 250/370.09
See application file for complete search history.

(56) References Cited

U.S. PATENT DOCUMENTS 4,905,265 A * 2/1990 Cox et al. ................. 378/98.8
5,844,242 A * 12/1998 Jalink et al. ............ 250/370.09
6,035,013 A   3/2000 Orava et al. ................. 378/37

FOREIGN PATENT DOCUMENTS

GB   2278765   12/1994

OTHER PUBLICATIONS

Jalink, Antony et al. "CCD Mosaic Technique for Large-Field Digital Mammography". IEEE Transactions on Medical Imaging, IEEE Inc. New York, US, vol. 15, No. 3, Jun. 1, 1996, pp. 260-267, XP000587920 ISSN: 0278-0062.

* cited by examiner

*Primary Examiner*—Edward J. Glick
*Assistant Examiner*—Jurie Yun
(74) *Attorney, Agent, or Firm*—Wolf Block Schorr & Solis-Cohen LLP

(57) ABSTRACT

In the method are repeated the stages of: exposing (6) a zone of a sample to the X-rays through a collimator, exposing only the parts of the sample placed between it and some secondary boards of a main board; obtaining (7) the data generated by exposure of the sample; and moving (8) the mobile support to another zone of the sample. Next, the data to obtain a complete digital image are processed. The device comprises a source of X-rays, a data-gathering device, a detection module which has a main board upon which are arranged secondary boards, a collimator fitted between the main board and the source of X-rays; and a unit for processing the data. A continuous image without size limitation is obtained.

12 Claims, 2 Drawing Sheets

METHOD AND DEVICE FOR THE PRODUCTION OF DIGITAL IMAGES

This invention relates to a method and a device for the production of digital images, mainly with X-rays, at low doses and with high contrast, for the application thereof in medicine or other fields.

BACKGROUND OF THE INVENTION

Large-area detectors for obtaining X-ray digital images of large size are of considerable interest due to their potential use in a large number of applications, such as medicine, industry or applications related with security. The systems currently available in the market have a number of limitations in various aspects, and these involve major disadvantages.

A first limitation is based on the fact that the area of the surface for which it is possible to obtain a continuos image is generally small. This means that it is only possible to use the current devices for certain very specific applications.

A second limitation stems from the low quantum efficiency of the detectors, this being understood as the quotient between the number of photons captured by the detector in order to produce the image and the number of photons incident thereupon. The fact that said efficiency is low means that a high dose of radiation has to be supplied in order to produce a radiography. The main disadvantage of said limitation lies in excessive exposure to radiation of the individual or item of which it is wished to obtain the image or images, as such high exposure can lead to injury or harm, often irreparable.

A third limitation derives from the noise produced by the dispersed photons, which end up at any part of the image. Said noise is superimposed over that inherently found in any detector, and limits the possibility of obtaining images of objects with low contrast.

OBJECTS AND SUMMARY OF THE INVENTION

The method and the device of the invention manage to resolve the disadvantages mentioned, while providing other advantages, which will be described below.

The method for producing digital images comprises:
a. Repeating a predetermined number of times the stages of:
  exposing a zone of a sample to the X-rays emitted by a source of X-rays, through a collimator, exposing only the parts of the sample placed between it and, some secondary boards which form part of a main board and is fixed to a mobile support:
  obtaining the data generated by exposure of the sample to X-rays, by means of an electronic reading system and a data-gathering device;
  moving the mobile support to another zone of the sample;
b. Processing the data obtained by the data-gathering device in order to obtain a complete digital image of the sample, by means of a processing unit.

Thus is achieved a procedure in which it is possible to obtain images from samples of any size, which therefore means that it can be adapted to various applications such as medicine, industry or security.

Moreover, the procedure permits production of a continuous image as many times as large as the number of repetitions of the stages of section a., multiplied by the total area of the solid-state detectors.

Preferably, each secondary board comprises a solid-state detector coupled to the highly integrated reading electronics, a programmable logic controlling unit and an information storage device.

The solid-state detector is a room temperature detector which can be of a type and thickness suitable for providing a high quantum efficiency, which permits images to be captured with a high reduction of the dose of radiation in relation to that used in X ray systems which use exposure of a photographic film.

Preferably, the stage of data-gathering and the stage of movement of the mobile support are simultaneous, thereby achieving a reduction of the time needed for obtaining the digital image of the sample.

The stage of processing the data obtained by the data-gathering device comprises a transfer of the data stored in the information storage device to the processing unit, a reconstruction and processing of the image and a display of the image.

Advantageously, the information storage device is a random-access memory (RAM). Obviously other types of memories could be used.

Also advantageously, the processing unit is a personal computer.

According to one characteristic of the invention, the collimator has a plurality of holes, which coincide in position and size with the solid-state detectors mounted on the secondary boards. It is also possible not to use the collimator if the radiation dose is not a critical factor.

Thus, when the sample of which it is wished to obtain an image is exposed to the X-rays, said rays pass through the holes of the collimator, exposing only the parts of the sample situated beneath them and above the solid-state detectors fitted on the secondary boards. That is the sample is situated between the collimator and the secondary boards.

Depending on the application on which the method is used, it is possible to choose between different parameter's. Thus, the thickness of the solid-state detector can be between 10 µm and 1 cm, preferably between 300 µm and 2 mm; the surface area of the solid-state detectors can be between 1 mm×1 mm and 100 mm×100 mm, preferably between 5 mm×5 mm and 15 mm×15 mm; and the energy of the X-rays generated by the source of X-rays can be between 1 KeV and 2 MeV.

According to another aspect of the invention, a device for the production of digital images is characterised in that it comprises a detection module which has a main board upon which are arranged a plurality of secondary boards, with the detection module being fixed to a mobile support; a collimator fitted between the main board and the source of X-rays; and a unit for processing th data obtained by the data-gathering device.

Thus is obtained a device for producing digital images on the basis of a sweeping in two dimensions, which permits the production of a continuous image of the same area as that of the main board. The area of the main board can in principle be as large as wished and can, therefore, be: adapted to diverse applications such as medicine, industry or security.

Moreover, given that it is a digital image, it is easy to display, store and process using suitable graphic algorithms.

Furthermore, the manner in which the detection and image-capturing module is constructed reduces dispersed photons. This characteristic, in combination with the fact that the reading electronics can be optimised compensate for the leakage current from the detection module and operate in individual photon counting mode, permits the detection of objects with low contrast.

It is furthermore clear that the detection module is made up of small units (secondary boards), which can be replaced in the event of poor functioning. This means that the detector has high performance and a long average life, thus increasing its profitability.

Similarly, the characteristic described also permits flexibility when it comes to choosing the type of semiconductor to be used.

Each secondary board comprises a solid-state detector coupled to an integrated reading electronics device, a programmable logic controlling unit and an information-storage device. It is possible to have the programmable logic controlling unit and the information-storage device outside the secondary board.

According to one embodiment of the invention, the relative dimensions of the secondary board and of the solid-state detectors depend on the number of stages, that is, on the manner in which the sweeping movement of the main board is carried out.

Advantageously, the information storage device is a memory unit with high speed of access for reading and writing.

According to one characteristic of the invention, the collimator has a plurality of holes, which coincide in position and size with the solid-state detectors mounted on the secondary boards.

Moreover, the unit for processing of the data obtained by the data-gathering device is a personal computer.

Depending on the application to which the device is to be put, it is possible to choose between different parameters. Thus, the thickness of the solid-state detector can be between 10 µm and 1 cm, preferably between 300 µm and 2 mm; and the surface area of the solid-state detectors can be between 1 mm×1 mm and 100 mm×100 mm, preferably between 5 mm×5 mm and 15 mm×15 mm; and the energy of the X-rays generated by the X-ray source can be between 1 KeV and 2 MeV.

BRIEF DESCRIPTION OF THE DRAWINGS

For a better understanding of all that has been outlined some drawings are attached which show, schematically and solely by way of non-restrictive example, a practical case of embodiment.

DESCRIPTION OF A PREFERRED EMBODIMENT OF THE INVENTION

Figure 1:
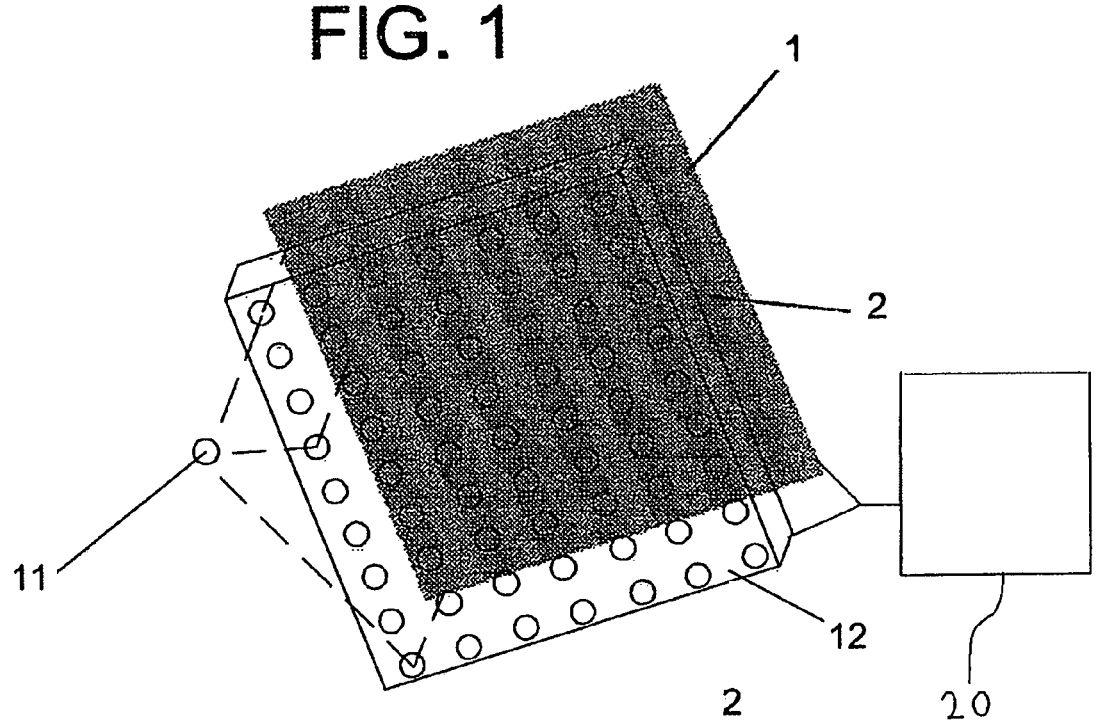
FIG. 1 is a schematic drawing of a main board measuring 25×20 cm, composed of 63 secondary boards, which forms part of the device for the production of digital images object of the invention.

As FIG. 1 shows, the main board 1 of the device for the production of digital images, object of the invention, serves as support for a plurality of secondary boards 2 fitted occupying adjacent positions. The main board 1 is a large-area printed circuit board of high quality and planarity.

Figure 2:
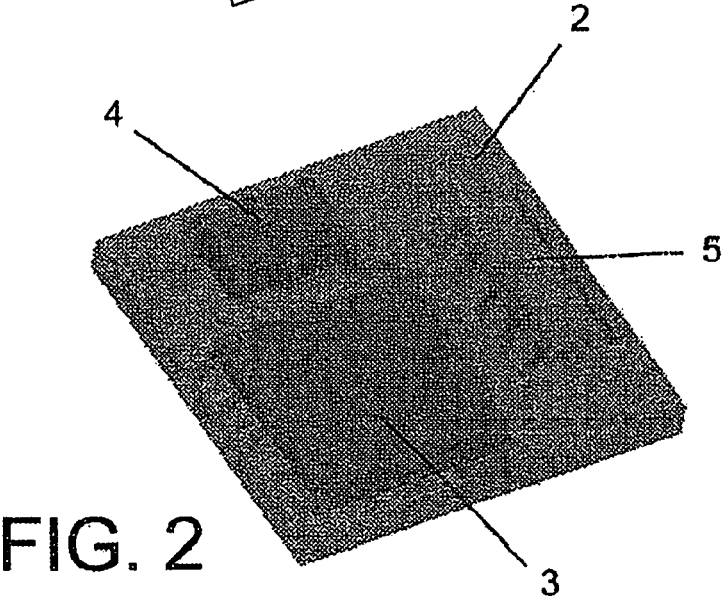
FIG. 2 is a schematic drawing of one of the many identical secondary boards which are on the main board of FIG. 1.

Each secondary board 2 (FIG. 2) contains a solid-state detector 3 (SSD) which works preferably at rodm temperature, coupled to a highly integrated electronic reading device (FEE, Front-End Electronics) (not shown), a programmable logic controlling unit 4 (PLC, Programmable Logic Controller) of the reading electronics, consisting in a processor or in a number of programmable ports, and a random access memory 5 (RAM).

It is preferable that the arrangement of the solid-state detectors 3 on the secondary boards 2 and the arrangement of the latter on the main board 1 be implemented with precision. The inclusion of markers on the detectors 3, secondary boards 2 and main board 1 permit their overall alignment. The tolerances on the positions can be reduced by providing correction files for the alignment (correction by software).

The main board 1, with all the secondary boards 2 already mounted on it, is attached to a mobile support 20 in two dimensions and with precise adjustment of the movements. Also attached to the support 20, mounted between the main board 1 and a source of X-rays 11, is a collimator 12 provided with holes whose size and positions coincide with the solid-state detectors 3 mounted on the secondary boards 2. The main board 1, the secondary boards 2 and the mobile support 20 move as a single unit.

The device of the invention also comprises a standard data acquisition system (DAQ), and a personal computer which will be used as a unit for exposure of the image and analysis thereof.

The procedure for the production of digital images is thus as follows.

Figure 3:
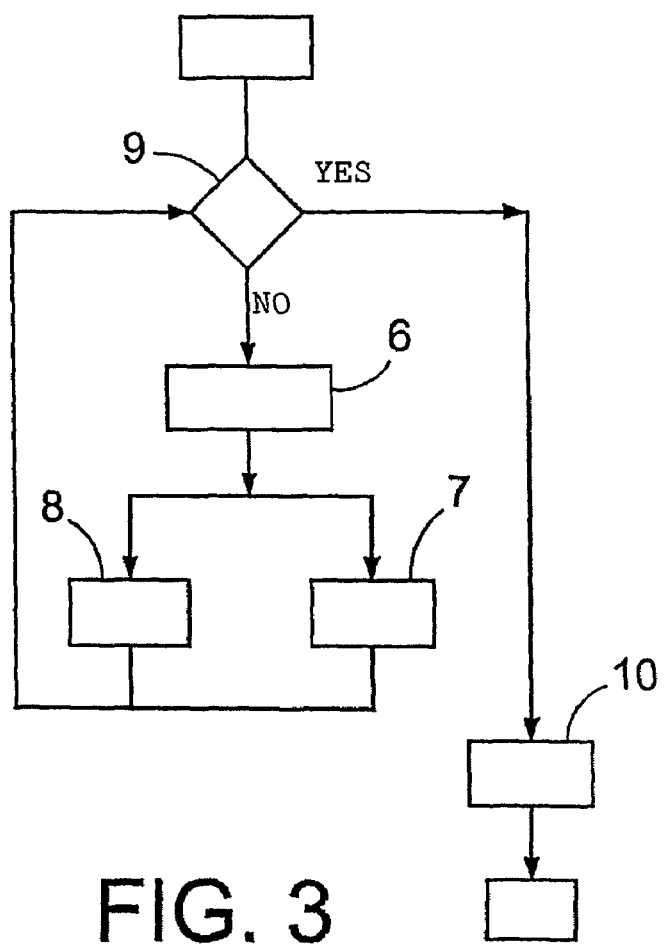
FIG. 3 is a flow diagram of the method for the production of digital images object of the invention.

Firstly, starting at a certain position on the sample, a stage 6 of exposure (FIG. 3) of the zone to the X-rays generated by an X-ray source is carried out, through the collimator mounted between said X-ray source and the main board 1. The rays pass only through the holes made in the collimator and expose only the part of the sample situated beneath them and above the solid-state detectors 3 mounted on the secondary boards 2.

Immediately and simultaneously there is a stage 7 of obtaining the data generated by the solid-state detectors 3 during exposure of the sample to the X-rays, by the reading electronics part and the data acquisition device; and a stage 8 of movement of the mobile support to another zone of the sample and then carrying out again the stage 6 of exposure of said zone to the X-rays.

Once the; previous stages have been carried out a predetermined number of times, as determined by a decision diagram 9, a stage of processing 10 of the data stored in the random access memory 5 of each of the secondary boards 2 is carried out. Said data are transferred to the personal computer, which acts by way of processing unit and reconstructs and processes the image and displays it on the monitor. From that time onwards the image can, for example, be saved or modified.

There follows a description of an illustrative but non-restrictive example of the invention, explaining how a digital mammography is obtained. In this example it is important that the size of the secondary boards 2 is less than double the size of the active area of the solid-state detector 3, since the image is to be produced with four sweeping passes.

One specific example based on this invention consists in a solid-state detector of Cadmium-Zinc-Tellurium, CdZnTe, which operates at ambient temperature, coupled by means of the bump bonding technique to a chip of the same size containing all the reading electronics. The size of the detector 3 is determined by that of the chip in this case, and is 1.4 cm by 1.4 cm, which means that it covers an approximate image area of 2 cm². The pixels, defined in the chip itself, are of 55 μm×55 μm. The dimensions of the secondary boards 2 must be less than 2.8 cm×2.8 cm. The size of the chip is not critical. The concept dean be applied to chips of smaller size. In fact, the smaller the size of the chip the smaller will be the movement of the mobile table, and therefore the shorter the time needed to capture an image.

The main board 1 contains 63 (9×7) secondary boards mounted in chess-board form, and therefore has a size of approximately 25 cm×20 cm, which are the typical dimensions of a mammography system (FIG. 1). With a main board 1 which had 15×15 secondary boards 2 like the preceding ones it would be possible to carry out radiography of an area of 42 cm×42 cm, which is the typical size used in radiography of the chest.

Figure 4:
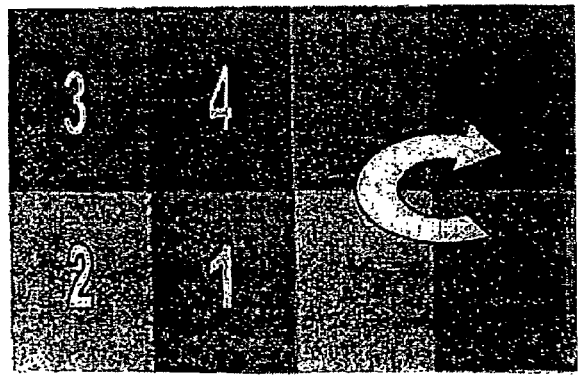
FIG. 4 shows the sequence of operations of the device of the invention, necessary to obtain an image, in the case of a sweeping carried out in four stages.

The complete image is obtained by means of movement of the main board 1, starting in position 1 (FIG. 4) and moving the table on which it is mounted 3 times according to the sequence −1.4 cm in direction x, +1.4 cm in direction y, and then +1.4 cm again in direction x, as shown in FIG. 4. By means of this sequence of movements the effective area covered by each detector unit is 8 cm², and the total area of the radiographed zone 504 cm². The collimator contains 63 holes aligned in such a way that they coincide with the active areas of the detection units.

The process of mounting the solid-state detectors 3 on the secondary boards 2 and said secondary boards 2 on the main board 1, and the fact that the table can be moved in steps of less than the size of a pixel, ensures a slight overlap (less than the size of a pixel) between the images taken by each detection unit.

In order to reconstruct an image of 8 cm² on the basis of a detection unit the procedure is simply as follows: in position 1 (FIG. 4) a beam of photons is projected for 0.1. seconds. The detector unit is then moved to position 2, which takes a time of 0.2 seconds. During this period of 0.2 seconds the data from the chip are transferred to the memory unit and the system becomes available again for the next exposure. And while the main board 1 (FIG. 1) moves from position 1 (FIG. 4) to position 2, the beam of X-rays is switched off. This is achieved by using an X-ray tube with a triggering door device. All the steps for positions 3 and 4 (FIG. 4) are then repeated.

The total exposure time is thus equal to the total exposure time in any particular position (0.1 seconds) multiplied by four exposures, plus the time due to a movement (0.2 seconds) multiplied by three movements, that is 4×0.1 secs.+3×0.2 secs.=1 sec.

Despite the fact that reference has been made to one specific embodiment of the invention, it will be obvious to an expert in the subject that the method and the device described lend themselves to numerous changes and modifications, and that all the details mentioned may be replaced by others that are technically equivalent, without departing from the field of protection defined by the attached claims.

The invention claimed is:

1. Method for producing digital images which comprises two subsequent and independent steps:
   a. Repeating a predetermined number of times the stages of:
      exposing (6) a zone of a sample to the X-rays emitted by a source of X-rays (11), through a collimator (12), exposing only the parts of the sample placed between it and some secondary boards (2) which each comprise a solid state detector and form a removable part of a main board (1) which is fixed to a mobile support (20), each of said solid-state detectors (3) coupled to an integrated reading electronics device, a programmable logic controlling unit (4) and a local information-storage device (5);
      saving and storing (7) in the local information-storage device (5) the data generated by exposing the sample to X-rays, using an electronic reading system and a data-gathering device;
      repositioning on the basis of a sweeping two dimensional motion (8) the mobile support (20) to another previously unexposed zone of the sample;
   b. After the entire area of the sample has been exposed to the X-rays, reading out the data (10) stored in the local information-storage device (5) to a processing unit, where the data is processed and combined to obtain a full digital image of the sample to be displayed on the monitor.

2. Device for the production of digital images comprising: a source of X-rays; a data-gathering device; a detection module which has a main board (1) upon which are arranged a plurality of easily replaceable secondary boards (2), wherein each secondary board (2) comprises a solid-state detector (3) coupled to an integrated reading electronics device, programmable logic controlling unit (4) and an information-storage (5), and wherein the detection module is fixed to a mobile support (20); a collimator (12) fitted between the main board (1) and the source of X-rays (11); and a unit for processing the data obtained by the data-gathering device.

3. Device according to claim 2, wherein the programmable logic controlling unit (4) and the information-storage device (5) may be located outside the secondary board (2) but not outside of the data-gathering device itself.

4. Device according to claims 2, wherein the relative dimensions of the secondary board (2) and of the solid-state detectors (3) depend on the number of stages, that is, on the manner in which the sweeping movement of the main board (1) is carried out.

5. Device according to claim 2, wherein the information storage device is a memory unit with high speed of access for reading and writing.

6. Device according to claim 2, wherein the collimator (12) has a plurality of holes which coincide in position and size with the solid-state detectors (3) mounted on the secondary boards (2).

7. Device according to claim 2, wherein the unit for processing of the data obtained by the data-gathering device is a personal computer, which is used to combine the data into a full image of the sample.

8. Device according to claim 2, wherein the thickness of the solid-state detector (3) is between 10 μm and 1 cm.

9. Device according to claim 2, wherein the surface area of the solid-state detectors (3) is between 1 mm×1 mm and 100 mm×100 mm.

10. Device according to claim 2, wherein the energy of the X-rays generated by the X-ray source is between 1 KeV and 2 MeV.

11. Device according to claim 2, wherein the thickness of the solid-state detector (3) is between 300 μm and 2 mm.

12. Device according to claim 2, wherein the surface area of the solid-state detectors (3) is between 5 mm×5 mm and 15 mm×15 mm.

* * * * *